(12) United States Patent
Mushovic (10) Patent No.: US 6,387,504 B1
(45) Date of Patent: May 14, 2002

(54) POLYMER SURFACED COMPOSITES FOR FLOOR TILES AND OTHER BUILDING STRUCTURES

(75) Inventor: John N. Mushovic, Poughkeepsie, NY (US)

(73) Assignee: Margrace Enterprises INC, Hanover, PA (US)

( * ) Notice: Subject to any disclaimer, the term of this patent is extended or adjusted under 35 U.S.C. 154(b) by 0 days.

(21) Appl. No.: 09/328,494

(22) Filed: Jun. 9, 1999

Related U.S. Application Data (60) Provisional application No. 60/088,702, filed on Jun. 9, 1998.

(51) Int. Cl.[7] .............................. B32B 27/38; B32B 5/16; B32B 5/14
(52) U.S. Cl. ...................... 428/413; 428/423.1; 428/48; 428/426; 428/480; 428/482; 428/500; 264/239; 264/DIG. 31; 106/713; 106/737; 106/738; 106/728; 106/719; 524/444; 524/493; 524/425; 524/430; 524/529; 524/599; 524/499; 525/437
(58) Field of Search .............................. 428/48, 423.1, 428/426, 480, 482, 500; 264/239, DIG. 31; 106/713, 737, 738, 728, 719; 524/444, 493, 425, 430, 437, 429, 599, 499

(56) References Cited

U.S. PATENT DOCUMENTS

| | | | | |
|---|---|---|---|---|
| 3,177,902 A | * | 4/1965 | Rubenstein |
| 4,269,869 A | * | 5/1981 | Morohashi et al. |
| 5,658,624 A | * | 8/1997 | Anderson et al. |
| 6,005,043 A | * | 12/1999 | Zhu |
| 6,054,502 A | * | 4/2000 | Friedlander et al. |

* cited by examiner

*Primary Examiner*—Robert Dawson
*Assistant Examiner*—Kuo-Liang Peng
(74) *Attorney, Agent, or Firm*—Robert A. Cahill (57) ABSTRACT

Composites useful in building structures such as floor tiles, are prepared having a very strong bond between a highly filled polymeric surface layer and a cementitious backing. The composite comprises: a first layer of solid particles intimately mixed with a polymeric binder; a second layer of an organic and/or inorganic solid; and a transitional layer located between the first and second layers comprising both the polymeric binder and the organic and/or inorganic solids wherein the polymeric binder is contained in pockets within the organic and/or inorganic solid and at least some of the pockets of the polymeric binder extend from the first layer.

15 Claims, 4 Drawing Sheets

POLYMER SURFACED COMPOSITES FOR FLOOR TILES AND OTHER BUILDING STRUCTURES

This application claims priority of provisional application No. 60/088,702 filed on Jun. 9, 1998, the entire contents of which are hereby incorporated by reference.

FIELD OF THE INVENTION

The present invention relates to composites useful in building structures such as floor tiles, pavers, flagstones, etc., and methods of preparing the same.

BACKGROUND OF THE INVENTION

The existing processes to polymer coat or glaze Portland cement based structures are performed using cured Portland cement based structures as inserts or finished components. In other words, prior to polymer coating, glazing or painting masonry on concrete surfaces, the Portland cement based structures are in an advanced stage of cure, i.e., the concrete structures are well aged or heat processed to the point where they are easily handled.

The conventional method of glazing concrete structures is to apply the highly filled polyester or epoxy material on Portland cement based structures produced by dry casting the material. In this process, the water to cement ratio (w/c) is minimized by tumbling the aggregates with closely controlled amounts of water and applying pressure to consolidate the damp vibrated mix even further. These dry cast blocks are often glazed with a thermoset polymer after ~24 hrs of initial consolidation. Other processes for decorating cured concrete areas include painting with moisture or air cured materials, spraying freshly mixed two component systems normally followed by a post cure and "broadcast" whereby freshly mixed unsaturated polyester or epoxy is rolled onto cured (mud, in some cases newly hardened and damp) floors followed by broadcasting colored sand and quartz into the polymer, letting it cure and sweeping away the excess mineral.

Thus, the bonding between the coating and the concrete surface using these conventional processes is basically chemical in nature. The composite of the present invention has a bond between the thick coating or glaze and the concrete structure which is superior in strength to the conventional composites, since the bond is not only chemical, but is strongly mechanical in nature consisting of numerous mechanisms, many of which are not available to the above decorative techniques. The present method provides a mechanism for forming a substantially thick transitional layer between the polymeric coating and the concrete structure which comprises three dimensional structures (herein alternatively referred to as Locks "L" or pockets) that act to mechanically hold the layers together, thereby forming a strong bond between the coating and the concrete which is both chemical and mechanical in nature.

The present Inventor is not aware of any process for the preparation of a composite tile wherein freshly mixed organic and inorganic based materials are sequentially deposited at a point when the curing process has either not been initiated or has just been initiated. This method results in a multitude of bonding mechanisms between the components and provides for excellent adhesion between very dissimilar materials. The composite tile is economically advantageous due to the lower cost of the requisite raw materials and has the advantage in that the processing sequence is easily scaled to millions of units per year using either a multi station conveyor or automated carousel equipment.

Additionally, the present Inventor is not aware of ultraviolet light-curable materials being used on finished precast blocks or dry cast structures.

SUMMARY OF THE INVENTION

An object of the present invention is to combine thermoset and/or ultraviolet light curable thermoset polymers with complex fillers and concrete technologies to provide novel methods to produce low cost, functional designs of floor tiles and many other building products to provide limitless colors, styles and textures for both indoor and outdoor use.

Another object of the present invention is to prepare a composite having a cementitious backing with a polymeric coating having a strong bond therebetween.

And yet another object of the present invention is to dramatically reduce the time for preparation of the floor tile or other building structure composite by using ultraviolet light-curable materials with finished precast blocks.

The composite structure of the present invention is suitable for a wide range of building products and comprises:

a first layer of solid particles intimately mixed with a polymeric binder;

a second layer of an organic and/or inorganic solid; and optionally a transitional layer located between the first and second layers comprising both the polymeric binder and the organic and/or inorganic solids wherein the polymeric binder is contained in pockets within the organic and/or inorganic solid and at least some of the pockets of the polymeric binder extend from the first layer;

with the proviso that the transitional layer must be present unless the organic and/or inorganic solid is a cast structure having a smooth surface and the polymeric binder is curable with ultraviolet radiation; and with the additional proviso that when the organic and/or inorganic solid is a cast structure, then the polymeric binder is curable with ultraviolet radiation.

The tile or building structure will ultimately be positioned so that the first layer of the solid particles mixed with a polymeric binder forms the decorative surface. The surface connected pockets or locks of the polymeric binder within the transitional layer result from combining the backing material when it is in the form of a slurry, paste or liquid with the filled polymerizing or polymerizable solution used to prepare the decorative polymeric binder of the surface layer, wherein the organic and/or inorganic slurry, paste or liquid is chosen to have a higher specific gravity than the polymerizable solution which is deposited first.

Additionally, the composite structure may have a third layer of a cured polymer resin which is in contact with at least one of the first, second or transitional layers, wherein the third layer has a color different from the first layer.

In an alternative embodiment of the present invention, the composite structure may be prepared using a mold, having at least a bottom plate of the mold, prepared from quartz, which is substantially transparent to ultraviolet radiation. A UV curable filled polymeric binder is first prepared in the mold, and then a backing material is placed on the filled polymeric binder. Curing of the polymeric binder in the mold, is engendered by shining the ultraviolet radiation upward through the quartz plate.

The composite structure of the present invention having a transitional layer is prepared by a method, comprising:

combining a first polymerizable solution with first solid particles, which may be a blend of two or more types of solid particles, settling the first solid particles in the first polymerizable solution thereby forming a first layer, wherein the amount of the first polymerizable solution used is sufficient to at least submerge all of the first solid particles after the settling step, contacting a slurry, paste or liquid with the surface of the first polymerizable solution, wherein the slurry, paste or liquid has a higher specific gravity than the first polymerizable solution, allowing the first polymerizable solution to migrate into the slurry, paste or liquid to form pockets of the first polymerizable solution in the slurry, paste or liquid, wherein at least some of the pockets remain connected to the first layer;

curing the first polymerizable solution.

The composite structure of the present invention using ultraviolet light-curable polymers is prepared by a method, comprising:

combining a first polymerizable solution with first solid particles, settling the first solid particles in the first polymerizable solution, wherein the amount of the first polymerizable solution used is sufficient to at least submerge all of the first solid particles after the settling step, contacting the surface of the first polymerizable solution with a cast structure, curing the first polymerizable solution with ultraviolet radiation to form a polymeric binder which acts as the composite structure's surface.

These methods may be performed in a mold having a bottom wall connected to side walls, wherein the bottom wall has at least one raised configuration. In the cure where the UV curing is employed, the bottom wall is made of quartz. This mold is ideal for preparing a composite structure having three dimensional imprints. Additionally, the imprints can be prepared of a different color than the flat surface of the composite by applying (preferably by spraying) a colored solution of a second polymerizable solution to the at least one raised configuration before adding the first filled polymerizable solution.

Also envisioned, is to have a clear gel coat sprayed into the mold may precede the process.

DETAILED DESCRIPTION OF THE INVENTION

The composite structure of the present invention is suitable for a wide range of building products, and comprises:

a first layer of solid particles intimately mixed with a polymeric binder;

a second layer of an organic and/or inorganic solid; and optionally a transitional layer located between the first and second layers comprising both the polymeric binder and the organic and/or inorganic solids wherein the polymeric binder is contained in pockets within the organic and/or inorganic solid and at least some of the pockets of the polymeric binder extend from the first layer;

with the proviso that the transitional layer must be present unless the organic and/or inorganic solid is a cast structure having a smooth surface and the polymeric binder is curable with ultraviolet radiation; and with the additional proviso that when the organic and/or inorganic solid is a cast structure, then the polymeric binder is curable with ultraviolet radiation.

The phrase "cast structure" refers to a structure which has been solidified in a mold prior to its use in the preparation of the present composite. The phrase "pockets" refers to cavities of lightly filled polymeric binder wherein the lightly filled polymeric binder contained therein are continuous with the filled polymeric binder of the first layer.

In one embodiment, the transitional layer is formed when the organic and/or inorganic solid of the second layer is prepared from a slurry, paste or liquid which has a higher specific gravity than the polymerizable solution used to prepare the polymeric binder of the first layer.

In a second embodiment, the transitional layer is formed upon the combination of a UV curable first polymerizable solution (the source of the polymeric binder) and a cast structure having a textured surface comprising pockets. The UV curable first polymerizable solution flows into the pockets of the textured surface of the cast structure.

In the transitional layer, the pockets or locks of the polymeric binder, which are connected to the filled polymeric binder layer, act as a physical barrier to breakage and/or peeling of the filled polymeric binder "A/F'" from the cementitious backing. In essence, these connected pockets act as locks which mechanically hold the cast structure to the UV curable binder.

The composite structure optionally has a three dimensional imprint on its top surface by using a mold having a three dimensional configuration on the bottom wall of the mold. The imprint can be colored differently from the surrounding surface by including a third layer of a colored curable polymer resin which is in contact with at least one of the first, second or transitional layers.

In another embodiment of the present invention, the filled polymeric binder is curable with ultraviolet light and is combined with a finished cast structure backing.

Conventional two component curable resins include: unsaturated polyesters; Reichhold Chemical—blend of polylite 32169-10 with flexibilizers 32356 and 32358; Ashland Chemical—Aropol 7192 (and in some cases the flexibilizers above); Cook Composites and Chemical—Stypol 5831; Hehr International Polymers—1164 FN; Silmar—SIL 93B3-956; Hehr International Polymers—epoxy systems including QCE-II, QCE-III and QCE IV with numerous curatives; Shell epoxies and curatives of the Epon Series—including 1510; Dow Chemical epoxies and curatives both DER and DEN series materials; Sartomer Company, Inc.—numerous acrylate and methacrylate monomers and oligomers for addition to methyl ethyl ketone (MEK) peroxide cured polyesters above, epoxies above and UV curable systems.

The UV curable materials which require increased cross-linking rates are blends of urethane acrylates or epoxy acrylates. These are selected from the Sartomer SR Series, M Series and CN Series Materials, and from Hehr International Polymers materials called HP-RC (polyester based) and 1448.

The cast structure is a conventionally manufactured (by high volume techniques) unit, such as a paver brick, masonry unit, concrete brick or a patio stone.

The solid particles which are used as filler in the first layer are selected from the group consisting of; aluminum trihydrate, fly ash, perlite, ground silica, calcium carbonate, transition metal oxides, a mineral granite mixture, colored polymer chips, aluminum trihydrate plus organic chip based granite mixture, injection molded thermoplastic pellets or chips, polymer coated silaceous minerals, natural ultraviolet light transparent minerals, opaque or transparent colored acrylic chips, pigmented acrylic modified unsaturated polyester chips and mixtures thereof.

A nonlimiting set of the mineral fillers useful in the present invention include the following:

Arizona Cultured Stone: two Series called Durastone, Granite Fill 2000;

RJ Marshall Co.: Stone Tex Granite-ST Series;

Huber Engineered Minerals: Granite Elite; and

Special Blends: silica, aluminum trihydrate (ATH), glass frit, fly ash plus colored ships of Clifford Estes Co. polymer coated quartz, 1.7 g/ml colored filled acrylics and 1.0 g/ml colored acrylics.

The polymeric binder of the first layer is selected from the group consisting of polyurethanes, polyepoxides, epoxy-acrylates, polyurethane acrylates, unsaturated polyesters, acrylics and mixtures thereof.

The solid particles used as filler in the first layer are in the range of 20–65 wt % and the polymeric binder is in the range of 80–35 wt % based upon the total mass of the first layer.

The organic and/or inorganic solid of the second layer is prepared from a slurry, paste or liquid comprising Portland cement and at least one of flyash, sand, gravel, acrylic latex, an accelerator, a water reducer and water.

The organic and/or inorganic solid of the second layer is added to the layer A/F' when no more than 5% of layer A/F' has been cured.

The types of mixtures which can be used in preparing the organic and/or inorganic solid in the backing (second) layer include:

Inorganic and Mineral based binders—
1) Five ASTM types of Portland Cement defined by the differing percentages of common constituents and grind contained therein,
   Type I,
   Type II,
   Type III,
   Type IV, and
   Type V;
2) Modified Portland Cements such as Portland Pozzolan, Type IP (15 to 40% pozzolan), and Type 1—Pur (0 to 15% pozzolan);
3) Slag Cement—Slag composed of lime, silica, and aluminum, such as Lime slag (70% slag), Portland blast furnace slag (20–85% slag), supersulfated cement (80 to 85% slag);
4) Expansive cements;
5) Rapid hardening cements;
6) White cement (type I or type III with high tricalcium aluminate), iron free clay, kaolin, Masonry cement;
7) Oil well cement;
8) Natural cement;
9) New Portland inorganic cement (high aluminum content);
10) Gypsum Plaster;
11) Magnesium oxychloride cement; and
12) Phosphate bonded cements In organic based binders, polymer based binders or polymer concretes using two or more organic thermoset component materials are possible.

The accelerator is selected from the group consisting of: soluble inorganic salts, e.g., calcium chloride; soluble organic compounds, e.g., soluble alkali or alkaline earth carbonates, especially sodium carbonate; aluminates, especially sodium aluminate, calcium fluoroaluminate or calcium sulfoaluminate; halides, especially fluorides; ferrites; calcium formate; calcium acetate; triethanolamine; and calcium aluminate cements.

The water reducer is selected from the group consisting of salts and derivatives of lignosulfonates, salts and derivatives of hydroxy-carboxylic acids, polymeric materials such as superplasticizers, sulfonated melamine-formaldehyde condensate, and naphthalene sulfonate-formaldehyde condensate.

The composite structure may additionally include second solid particles of recycled glass beads, ground plastics, aluminum trihydrate, glass frit, flyash, pearlite, fiberglass rovings in the first, second and/or transitional layers.

Figure 2:
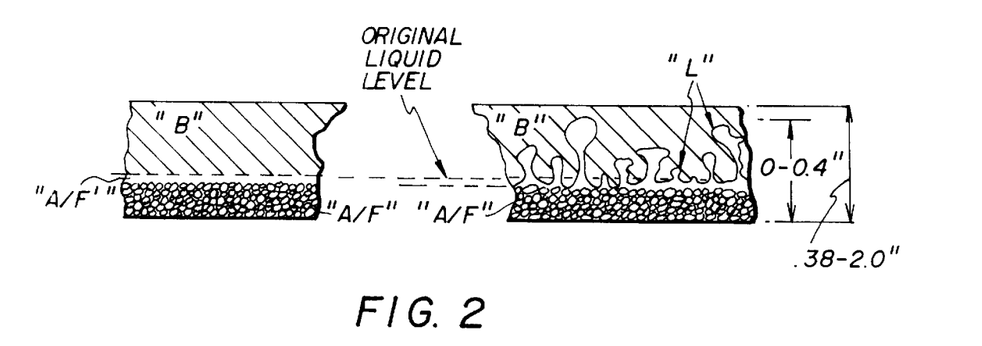
FIG. 2 is a cut-away view of the mixture upon addition of the slurry, paste or liquid "B", wherein pockets of the filled first polymerizable solution "A/F'" are formed by migration into "B" is evident.

The method of preparing the composite structure of the present invention which is suitable for a wide range of building products, comprises:

combining a first polymerizable solution (which may be UV curable) with first solid particles, settling the first solid particles in the first polymerizable solution, wherein the amount of the first polymerizable solution used is sufficient to at least submerge all of the first solid particles after the settling step, contacting a slurry, paste or liquid with the surface of the first polymerizable solution, wherein the slurry, paste or liquid has a higher specific gravity than the first polymerizable solution, thereby creating the driving force to cause the first polymerizable solution, as modified during settling, to migrate into the slurry, paste or liquid to form pockets which remain connected to the polymerizable solution of layer A/F' and/or A/F, see FIG. 2;

curing the polymerizable solution and backing.

Another embodiment includes a method of preparing a composite structure, comprising:

combining a first polymerizable solution with first solid particles, settling at least some of the first solid particles in the first polymerizable solution, wherein the amount of the first polymerizable solution used is sufficient to at least submerge all of the first solid particles after the settling step, contacting the surface of the first polymerizable solution with a finished cast structure, and curing the first polymerizable solution with ultraviolet radiation to form the composite structure.

The conditions under which the composites of the present invention can be produced range from 10–270° C. and from 0.5 to 100 atm. Preferably, the composites are prepared under ambient conditions.

The first polymerizable solution "A" may be a solution of: one type of monomer, e.g. MMA; a mixture of monomers; a mixture of oligomers; a mixture of oligomers and polymers; a polymeric solution, e.g., two component epoxies or polyurethanes; a blend of compatible polymers and monomers; a solution of partially crosslinked polymers and monomers for further crosslinking, e.g., a polyester diluted with styrene; a blend of epoxies and amine curatives; a solution containing acrylates, bisphenol A and an epoxy resin containing novolac where the resin is cured with a mixture of aliphatic and cycloaliphatic amines; aliphatic polyurethanes; and high functionality acrylics with an effective photoinitiator to enhance UV curing The first polymerizable solution cures to form a decorative and functional polymeric binder selected from the group consisting of polyurethanes, polyepoxies, epoxyacrylates, polyurethane acrylates, unsaturated polyesters and acrylics. Numerous commercially available and formulated resins comprise these six classes of functional polymeric binders.

The class of polyurethanes includes Uniroyal Chemical's two component MDI based system B875 cured in the range of 240–250F, and several Hehr International Polymers single shot urethanes (1878). Preferred over either of the above is Hehr International Polymers 1448 system, which is water white and supplied in either a two component room temperature curable or UV curable material. This material is an aliphatic urethane containing acrylic.

Numerous polyesters and vinyl esters promoted with cobalt naphthenate and DMA are useful and can be cured using methyl ethyl ketone (MEK) peroxide. These resins are supplied by Reichhold, Ashland, Silmar, and Hehr International Polymers and represent an extensive spectrum of light or white colored resins. Included are Hehr International Polymers 1164-FN, an acrylic modified unsaturated general purpose polyester, and Silmar's SIL93BE-956 and Ashland's counterpart to this ISO-NPG based unsaturated polyester which perform well. Vinyl esters from Reinhhold and Ashland Chemical that are MEK peroxide cured. Both the polyesters and vinyl esters processed extremely well. However, there are three major drawbacks with these materials, including the UV curable filled material from Hehr International Polymers called HP-RC. All polyesters and vinyl esters scratched white, contained styrene, and yellow or change color as a result of UV exposure.

Numerous epoxy materials are usable as polymeric binder resins, including several commercially available two component flooring binders, such as Sherwin Williams Armorcoat, Hehr International Polymers 1377 system, and many blends of bisphenol A resins cured with aliphatic amines. The resins are obtainable from Shell Chemical and Dow Chemical while Shell and Air Products amine curatives are functional. Most epoxy curates are amber colored or dark. Some aliphatic amines are colorless and provide excellent water white starting points for first polymerizing liquid, A. These include isophorone diamine, modified isophorone diamine, TETA and some commercially available proprietary blends. However, normal bisphenol A, bisphenol F and novolac epoxies yellow over time.

The preferred epoxy systems are based on hydrogenated bisphenol A material (Shell's 1510) cured with isophorone diamine or its colorless modifications. All two or multi component room temperature curable epoxy based systems gave superior properties when post cured. The bisphenol A and bisphenol F systems will cure at 250° F. for two hours. The Novolac structures require 300° F. for two hours.

Most preferably, the polymeric binder resins are aliphatic polyurethane acrylics and the epoxy acrylates that are based on blends of bisphenol A acrylates. Acrylate monomers and oligomers provide a UV curable property to these systems as further advantage. Sartomer Corp. provides dozens of materials to tailor UV systems.

Figure 1:
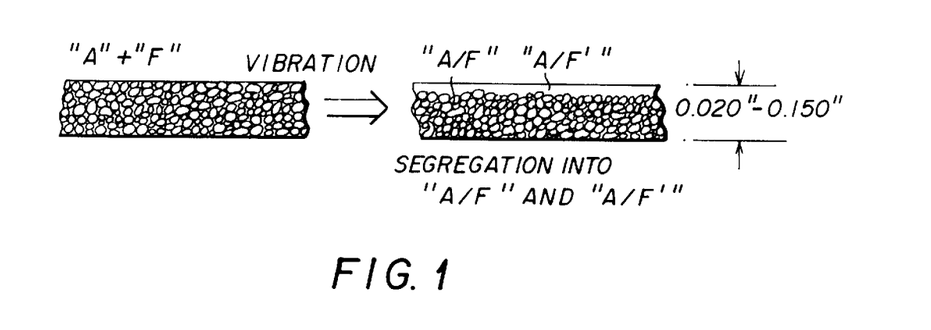
FIG. 1 is a cut-away view of a mixture of the settling step wherein the mixture of the first polymerizable solution "A" and filler "F" form two distinct filled layers "A/F" comprising "A" plus the majority of large particles and heavier fillers and "A/F'" comprising "A" and small fines and low density fillers.

Ideally, the amount of the first polymerizable solution used is sufficient to form a layer of the first polymerizable solution plus some filler above the first solid particles after the settling step, see FIG. 1 wherein this layer is referred to as "A/F'".

The relative specific gravity of the liquid, slurry or paste (which is used to prepare the backing material) and the partially filled first polymerizable solution layer "A/F'" is an important factor in controlling the length and shape of the pockets or locks formed in the transitional layer. The specific gravity of the liquid, slurry or paste is between 1.3 to 3.5 g/ml, preferably 1.4 to 2.5 g/ml.

The specific gravity of the partially filled first polymerizable solution layer "A/F'" is between 0.85 to 1.2 g/ml, preferably, 0.9 to 1.3 g/ml. If the specific gravity of the layer "A/F'" is less than 0.85 g/ml, the layer loses its ability to overcome the surface tension of the liquid, slurry or paste. The specific gravity of the first initial polymer containing blend is 1.0 g/ml to 2.0 g/ml, preferably 1.5 to 1.6 g/ml. Layer "A/F'" may have a specific gravity of 1.0 g/ml to 3.5 g/ml with 1.2 g/ml to 2.5 g/ml being most preferred.

The composite structure may be prepared with a three dimensional imprint on its surface which is formed using a mold having a bottom wall connected to side walls, wherein the bottom wall has at least one raised configuration. This imprint may be colored differently from the nonimprinted surface by applying (preferably by spraying) a colored second polymerizable solution to the at least one raised configuration before or after adding the first polymerizable solution.

The method optionally includes the step of adding a second solid to layer of the first polymerizable solution formed after settling, wherein the second solid is selected from the group consisting of polymer coated quartz particles, ground plastic waste particles, glass fragments, metal shavings, and other materials that are added to increase mechanical bonding by providing undercuts. In order to reduce the likelihood that relatively dense second solids will sink to the mold-first polymerizable solution interface, the first polymerizable solution can be allowed to enter into the preliminary stages of gellation to increase the viscosity.

In one embodiment of the invention, the first and/or second solid particles are substantially transparent to ultraviolet light and the first polymerizable solution is curable with ultraviolet light.

The phrase "substantially transparent" solid is defined herein as a solid which absorbs less than 80% of the incident light.

The innovations encompassed by the present invention suggest unique approaches that may be used to bond organic polymer resins containing substantial amounts of mineral or polymer filler to a Portland cement-based or organically-based backing structure.

Ideally, there is a layer of lower and differently filled first polymerizing solution "A/F'" after the settling step. This layer may result from segregation which may occur after the reactive liquid surface forming resin and hardener components are mixed with the filler "F". The formation of the layer is time dependent, see FIG. 1. This result can be obtained when the filled polymer surfacing components of the overall composite segregate into: (1) a more densely packed filler than the packing which naturally occurs after addition of the filler to the first polymerizable solution, layer "A/F"; and (2) a less filled first polymerizable solution component "A/F'". The less dense filled first polymerizable solution component "A/F'" rises above the filled layer, "A/F". This characteristic to form a liquid layer is sometimes associated with filled two or multi component reactive liquid thermoset polymers.

Conventional thought, which goes contrary to the present invention, dictates that the appearance of a segregation of this type would be deleterious to the composite structure, and great lengths would be taken to avoid its occurrence as this layer would impart structural stresses due to the direct bonding of two dissimilar polymeric materials with two distinct coefficients of thermal expansion. The factors that favor segregation of the surface polymer initially composed of "A" and "F" into a less filled layer of "A/F'" and more highly filled layer "A/F" are many. The time dependent formation of the resin layer includes but is not limited to the density of the filler, the viscosity of the polymerizing resin, the rate of change of the viscosity of the resin resulting from on-going polymerization once the reactive liquid components that comprise "A" are mixed, the cure rate, the specific gravity of the curing polymer, characteristics of the filler itself, the percent fill level, particulate size, blends of particulate sizes, vibration frequency, temperature of the components, pressure, resin type and numerous other factors.

When the transitional layer is formed from a liquid, paste or slurry backing material, the height of the pockets or locks of the transitional layer is controllable by the relative amount of A/F' to A/F, properties of A/F', density and curing rate of backing liquid, paste or slurry and many other factors.

In an embodiment of the invention, wherein the ratio of A/F' to A/F is 30%, the lock height normal to the A/F interface could exceed 0.200 inches. In a preferred embodiment, wherein the ratio of A/F' to A/F is less than 30%, the lock height is 0.200 inches or less.

In another embodiment of the invention, wherein the ratio of A/F' to A/F is increased to 60–70%, the lock height could be made larger and approach 0.500 inches. Variables which increase the lock height and density in the transitional layer include: increasing the ratio of A/F' to A/F; increasing the density of the backing; increasing the green time of backing and/or reducing the gel time of A/F'; lowering the surface tension of the liquid A/F'; and increasing the resistance to dissolution of liquid A/F' in slurry B.

The amount of fines contained in the first polymerizing liquid is also very important as these fines decrease the fluidity of the liquid. The term "fines" is defined herein as a solid having an average particle diameter of 0.2 to 250 microns.

In an embodiment of the invention, the fines constitute from 20 to 70 wt % of the filler blend F. Preferably, the fines constitute approximately from 25 to 65 wt % of the initial filler blend, F. More preferably, the fines constitute approximately 50 wt % of the initial filler blend.

Reducing the fines to 25 wt % of the initial filler blend, F, will substantially modify the structure of the locks to become longer while still being connected to the surface layer, A/F', with a thinner stalk. Also the filled polymeric layer A/F' will have a higher tendency to form isolated pockets of resin in or on the top surface of backing B. In the UV cured compositions, the overall range of filler F contained in liquid A are substantially reduced, therefore, the fines in the UV curable compositions are reduced.

Increasing the concentration of the fines in the filler to be over 65 weight percent reduces the size of the layer A/F' and as a result, the size and density of the locks will be reduced.

The amount of filler in the first polymerizable solution can be up to 83 wt % based upon the mass of the first polymerizable solution and the filler. Preferably, the amount of filler in the first polymerizable solution can be from 20 to 65 wt % based upon the mass of the first polymerizable solution and the filler. Generally, the amount of filler is controlled by the particular filler's ability to provide an attractive functional surfaces.

For instance, a high density A/F layer can be obtained using tri- or tetra-modal silica blends to 83 weight percent filler based upon the mass of the first polymerizable solution and the filler. An A/F' layer will form after settling even at the 83 wt % filler level. On the other hand, a first polymerizable solution containing 20 weight percent of pearlite (sil-cell 35 supplied by Silbrico) would result in a mixture of A and F with insufficient A to even wet all the filler, F. When designing a filler blend to be added to the initial polymerizable liquid A, it is necessary to produce several trial blend ratios.

A second method is to place in a mold a surfacing material comprising a filled cured and optionally preshaped polymeric material or insert and then adding the first polymerizable solution onto the top surface of the insert to thereby form the transitional layer. This top surface material may originally have been formed by press molding, a preconstructed insert, injection molding, rolling and numerous other methods. The insert or surface material may be a completely different in composition than the first polymerizable solution that forms layer "A/F'" deposited onto it. The major requirements of the filled polymerizable solution "A/F'" so introduced is that it adheres well to the surface material and it facilitates the slurry processes described above. This reacting or polymerizing single or multi-component liquid (layer "A/F'") may be sprayed, cast, troweled or poured onto back of the decorative and functional surface.

A third method to produce the two layers "A/F" and "A/F'" is available to filled UV cured polymeric materials. When UV curable polymers are filled with certain cured polymeric and natural minerals, the optimum decorative and functional properties can be obtained using the following procedure. The filled UV curable polymeric material is placed on a UV transparent material (e.g., quartz) which is supported at its edges. A correctly formulated material separates into two layers, sublayer "A/F" and a top layer "A/F'" on the transparent mold face surface. Note in contrast to systems where "A" contains a resin and a hardener or curing agent, the "A" component will not cure until exposed to ultraviolet light. An advantage being the almost instantaneous hardening produced by the photochemical reaction thereby reducing production time.

The UV source is placed under the glass while the solid porous backing structure (a dry cast or pressed concrete product) is placed on top of layer "A/F'". Upon activation of the ultra violet source, the surface is polymerized fag immediately and bonded to the backing layer through mechanisms produced as described below.

Ideally, the first filled polymerizable solution is topped by a second material (which ultimately becomes the backing of the composite) having a higher specific gravity than the layer derived from the first filled polymerizing solution after the settling step. In the case where the second material is an inorganic liquid or slurry, then the solubility of the first polymerizing solution must have very low solubility with the backing liquid or slurry. The second material may be (1) an inorganic mineral rich setting or curable material like concrete or (2) in the case where UV curable filled materials are used as the first polymerizable solution, conventionally dry cast porous concrete structures are ideal. Highly fly ash filled or fines filled Portland cement based slurries are excellent inorganic materials for the curable slurry backing component since they provide a relatively homogeneous matrix.

There are two distinct types of composite backing materials "B". In the first type, the backing material is formed from an inorganic and/or organically based liquid, slurry or paste having a higher density than the first polymerizable solution and in the case of an inorganic slurry, a low miscibility with the first polymerizable solution. The backing material is poured or placed directly onto the first polymerizable solution surface layer "A" (which has already begun curing), at which point the first polymerizable solution begins to migrate into the backing liquid/slurry/paste forming pockets or locks of first polymerizable solution, wherein at least some of the pockets are linked with the first polymerizable solution surface layer "A/F'". The resultant three dimensional structure provides excellent bonding between the organic surface and the inorganic concrete backing (or organic based backing) Additionally, these steps used in forming the composite are compatible with the sequence of steps required by commercially available equipment used for producing multi millions of parts yearly in automated press equipment. Therefore, the existing automated equipment can be easily adapted for the present process.

The second case deals with pre-manufactured backing inserts used in conjunction with uv curable filled polymeric materials. When the backing material is a solid, the solubility of the polymeric surfacing resin with the backing material becomes a minor issue. It is beneficial to the bonding process that the backing material be porous so as to provide a mechanical lock. There are also minor additives, e.g., A.R. fibers, known to the skilled artisan and are not particularly limited, that can be introduced to the dry cast concrete process that further facilitate excellent bond formation between the UV curable filled organic surface and pre-formed inorganic backing. The most desired outcome is that the first polymerizable solution is UV curable and also bonds well to the solid backing material without the need for additives. There are many concrete backing material densities and surface textures that are possible.

The initial behavior of highly filled single or multi-component first polymerizable solution, "A", and blended filler, "F", specific filler information; polymer type and the function of both layers "A/F" and "A/F'" are explained. Note in the following discussions, ideally liquid "A" is made up of at least two components—a thermoset resin and a curative, which when mixed immediately initiate polymerization.

It has been found that mineral based fillers and mineral mixtures react very well with numerous polymerizable solutions. After mixing and vibration, these fillers and filler mixtures when incorporated into the first polymerizable solution in the range from 20 to 65 weight percent yield two layers, "A/F" and "A/F'". For example, mixtures containing one or a combination of white aluminum trihydrate, ground silica, calcium carbonate or aluminum oxide can be used with pigmented polymer coated quartz mineral colored chips or through colored acrylic chips can be used as a filler material, "F". Filler mixtures made from these types of materials when added to freshly mixed reactive liquid thermoset components produce an initially homogeneous filled prepolymer that segregates or can be segregated into a highly filled polymerizable layer, "A/F" and a polymerizable solution layer, "A/F'". The cosmetically appealing filled cosmetic surface layer, "A/F", normally represents approximately three quarters of the overall thickness with one quarter being the layer, "A/F'", as shown in FIG. 1. For a textured surface (e.g. slate) to be replicated closely micron sized particles of either fine ground silica, fly ash, aluminum oxide, aluminum trihydrate, fines from natural quarried, modified natural minerals or combinations of these minerals must be used. Polymers containing larger particles cannot provide the fine surface detail necessary to produce the correct appearance and texture. This should be balanced with the fact that light weight filler materials (e.g. micro spheres, pearlite or finely ground plastics) tend to increase the viscosity of the polymer liquid "A" and stay dispersed. However, in the correct filler blends and ranges, the light weight fillers do provide a very important function as described later.

Six distinct classes of multi-liquid first polymerizable solutions, "A" were evaluated in this work. These were polyurethanes, polyurethane acrylates, epoxies, epoxyacrylates, unsaturated polyesters and pure acrylics. Each could be made to produce a structure having a many fold increase in bond strength when compared to conventional composites combining the layers in a highly cured state. The planned two component composite actually transitions to a three component layered structure as explained.

The highly filled layer "A/F" resulting from either a segregation phenomenon or produced through other means has several important functions. It must provide the properties important for the application. For example, with floor tiles this includes wear resistance, UV stability, stain resistance, impact resistance, delamination resistance under freeze-thaw conditions, appearance and many others. It must provide the required processing functions including the ability to support much larger and heavier particles that cannot be allowed to sink through the polymerizing mass to the mold/first polymerizable solution interface, thereby destroying the cosmetic surface function and it must not be affected by moisture during the curing process. It also may provide the source and act as the containment vehicle for the first polymerizable solution layer "A".

The composite is not particularly limited to a single slightly filled first polymerizable solution layer, "A/F'", but may also have layers "A1", "A2", etc . . . , of which "A/F'" may be the only layer which results from a segregation effect, and the others result from various possible other means of deposition. These other layers can act to provide several important functions, such as a decorative, cost reducing or specialty function as described in the Examples described herein.

It is important that "A" be integral with, and adhere well to "A/F" while additional polymerizing liquid layers must be able to bond to "A/F" or "A/F'". Liquid layers that are added, if required, must bond well to the existing polymer layers or be modified through chemical derivation to do so. Also, these layers must bond well to down-stream additions of chemical or mechanical bonding sites for the Portland cement based concrete backing or organically based backing. Most importantly, at least one of the liquid layers, independent of origin, must provide the material source for the pockets or locks, "L", which are formed by the migration of "A/F'" into the backing material "B" before substantial curing has occurred. These pockets form unique locking structures, "L" which form in the backing material "B". This also applies to the derivatives of the segregated layer "A/F'" that are produced during the parallel co-curing of the polymer layers and either the Portland cement based backing or an organically based backing.

FIG. 1 shows the mixed surfacing material immediately after deposition and the formation of a segregation layer after a low percentage of curing has occurred.

Reactive layer "A/F'" creates a very unique beneficial transition layer structure formed as the components of the composite are in the initial stages of cure. FIG. 2 shows the development of this layer during the mutual in situ curing process for all the composite components. The advantages of this phenomenon include: a) the unwanted segregation layer that creates strong bending stresses is substantially reduced if not entirely eliminated; and b) a random cellular structure is produced that provides a unique highly useful transition bonding phase between two totally different materials. Thus without the segregation of the original mixed liquid "A" and filler mixture "F" coupled with the application of an immiscible, denser liquid onto the surface of the polymerizing liquid layer, "A/F'", there would not be a driving force to produce the three dimensional growth patterns from this interface.

The conventional commercial approach, i.e., the utilization of a fast setting and highly filled (50–90 wt %) single or multi-liquid component based polymeric glaze composition, necessary to meet production cycles in the concrete block industry, would preclude and severely limit the formation of the required segregation layer "A/F'". In the conventional processes, very high filler loadings and fast cycle times are required to control production economics for these glazes which are over three eighths inches thick. In an effort to improve the cycle times over reactive liquid kinetics of resin and hardener, the present Inventor has performed substantial experimentation with UV curable materials.

It has been found that at certain filler levels and with specific fillers, it is possible to produce decorative structures having a significantly more desirable appearance than commercially available thick glazes or painted products supply. A major percentage of these decorative appearances and styles are either impossible to obtain or uneconomical when using conventionally cured two or multi-component filled thermoset systems. The desirable ability to economically scale-up the manufacturing process is gained through UV curing.

The unique bond mechanisms associated with the transitional layer described herein, can now be prepared from materials and processes that are state-of-the-art with a high output. The deposition of diverse UV curable materials form a unique bond mechanism having an extremely strong interface can be accomplished with simple spray equipment emitting zero volatile organic components (VOC's) using a material generating minuscule quantities of waste and requiring minuscule amounts of solvents for clean-up. In this embodiment, a major source of overall bond strength between the first layer and the backing layer is due to the wetting out of fibrous materials by the UV curable resins. It is of immense interest to note that the materials developed including those that are UV cured to thicknesses of over 0.125 inch are also the most UV stable and allow exterior color fastness which is a major innovation to the concrete products industry.

There are several controllable features of the first polymerizable solution "A/F'" layer that can be used to advantage with the initial highly filled polymer mix. Slight increases initial viscosity favor the production of pockets (or mechanical locks "L") of "A/F'" in the backing material "B" with more pronounced heads. For example, when backed with a 90 pound per cubic foot concrete, several high viscosity multi-liquid polymers including epoxy, epoxy acrylate, polyurethanes prepolymers and acrylics give very pronounced "headed" shapes while low viscosity unsaturated polyester and single shot urethanes give planar looking arrangements. Note, the number of locks, "L", can be large and often up to 30 per square inch have been counted. They also vary greatly in height and overall size with some only slightly above the original surface of the liquid layer "A" and some coming to the back surface of the Portland cement based backing structures that were three eighths of an inch thick. Diameters on the heads range from the diameter of the growing rod to three sixteenths of an inch. Very low viscosity unsaturated polyesters and single shot urethanes have been observed to form quasi-planes defined by a series of rods that have cured on the surface of Portland cement based backings.

There are additional important points to emphasize with regard to the first polymerizable solution "A/F'" layer. In order for the transitional layer to form, the backing material should have a specific gravity greater than it. The specific gravity of "A/F'" can be lessened significantly by the addition of lightweight fines. In this regard, commercially available fly ash and/or pearlite in all materials investigated have been used successfully. Pearlite does not segregate when added in the three to ten weight percent range of overall filled mix, "F", when a catalyzed unsaturated polyester is used as the first polymerizable solution, "A/F'". It does however increase the viscosity of the low cost unsaturated polyester with the consequent result of providing a more pronounced series of locks "L" with heads thereby decreasing the amount of linear and quasi planar arrays cured on the exposed surface of the backing. a highly fly ash filled Portland cement based backing to be light weight and still bond well to the highly filled thickened polymer. At the same time, materials such as pearlite and fly ash, when drawn into the bonding structures "L" add to the strength between layers, since they also chemically bond to the first polymerizable solution. For tiles that are substitutes for ceramic light weighting offers a major advantage in freight costs.

The use of glass fibers in either layer the first polymerizable solution "A" layer or the backing layer "B" can add to the overall strength between the filled polymeric layer "A/F'"and "B", since the polymerizable solution "A/F'" will act to wet the glass fiber. Thus, when glass fibers are added either directly to layer "A/F' " or as part of the curing or setting backing material "B", the viscosity of layer "A/F'" should be maintained at a low level. Additionally, when using fillers having a high specific gravity, one would begin with a low viscosity resin and the segregation potential would increase as the filler is mixed. In lieu of aluminum trihydrate, the conventional filler for countertops and slabs, one would consider clean silica which imparts similar translucency and color but displays much higher hardness, specific gravity and reduced oil absorption. This is very important when building bond layers between smooth surfaces produced at high pressure and UV curable coatings applied as a finishing step.

With regard to the addition of minerals, some types of minerals add to the strength of the bond between the filled polymeric layer "A/F'" and "B", and some reduce the strength. It was found that correctly sized river rounded quartz materials formed weak chemical bonds to the polymerizable solution "A/F'" layer and even weaker chemical bonds to the Portland cement based backing material, "B". There are, however, commercially available pigmented polymer coated quartz materials of the correct size for thin structures that chemically bond extremely well to the first polymerizable solution "A/F'" layer. The exact materials in the colored coating contributing to this bond are sold by the Clifford J. Estes Company. The Polymer Coated Quartz Particles, (PCQP's), represent an excellent means of creating mechanical locks to both the Portland cement based compositions and many other thermoset-based backings.

Strong chemical bonds resulted between the polymer coated quartz particles PCQP and the Portland cement based backing, "B", when chemical additives are included in the backing compositions. Eight polymer lattices and various compositions were evaluated as additives. Acrylics and water borne acrylics provided significantly increased bonding strengths between Estes's coating materials and the Portland cement based backing, "B", when used in the 1–2 wt % range.

Figure 3:
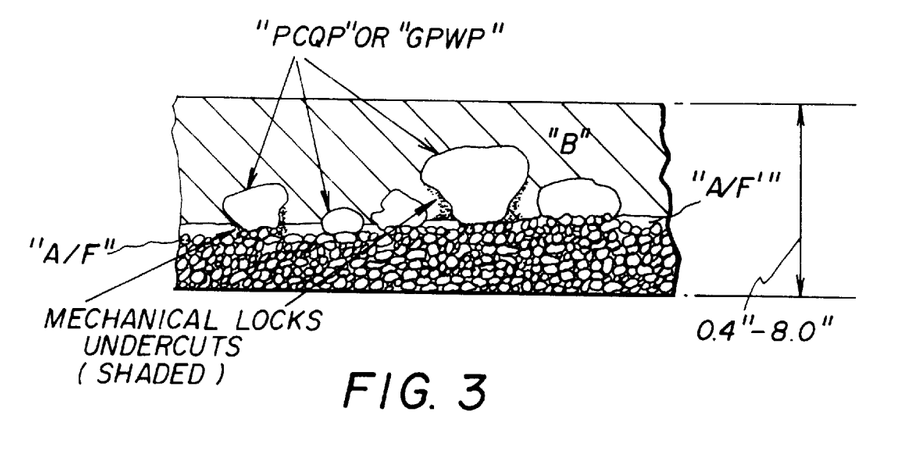
FIG. 3 is a cut-away view of the mechanical bonding mechanism between the organic/inorganic backing and either the polymer coated quartz particles or the ground plastic waste particles or any of numerous material, polymer or mineral solids that bond to "A/F'" and contain undercuts that the backing slurry solidifies around.

Also, the depth of layer A/F' and the average size of the PCQP or any particles is very important. The thickness of the layer averages less than 0.0325 inches thick as commercially practiced. The depth of layer A/F' should not exceed 50% of the diameter of the polymer coated quartz particles, "PCQP's". FIG. 3 demonstrates clearly the reason the chemical bond must be strong and the pool of "A/F'" liquid should be just sufficient to insure a strong bond.

In addition to, or in replacement of the PCPQ's, ground plastic waste particles (GPWP) can be used. Two basic types of GPWP's were evaluated. The polyolefins were represented by ground polyethylene. The bonds were poor between this material and both the "A/F'" layer and the Portland cement based backing "B". Also tested was the acrylic ground scrap. The bonds were strong in liquid layers composed of epoxy, epoxy acrylate, acrylic, unsaturated polyester and polyurethane. Additionally, the bonds were improved between the ground plastic waste particles "GPWP's" and a chemically modified Portland cement based backing containing acrylic latex as evidenced by the tenacity of the concrete film on these particles. Additionally, the bonds between the acrylic scrap particles and an organic backing were excellent as evidenced by all six generic materials previously described.

The acrylic latex and several other polymeric lattices were very beneficial to the properties of the Portland cement based backing material, "B" containing fly ash. Typical compositions containing Portland cement, sand, fly ash, water reducing and green strength accelerating in admixtures and water always demonstrated significant segregation of a hard brittle layer that formed on the back of a Portland cement based casting. The magnitude of this segregation on one inch high modules of rapture or MOR bars was over one eighth inch or twelve to twenty percent of the cured material by volume. The addition of a small percentage of acrylic latex totally eliminated the formation of this detrimental layer and made the matrix composition consistent throughout. The presence of this segregation layer would interfere with the locks "L" and could expose particle surfaces of both GPWP's and PCQP's in thin composite structures.

The following description contains various methods for optimizing the bond strength between the cosmetically appealing and functional highly filled first polymerizable solution "A/F'" surface and the low cost inorganic Portland cement based composite backing, "B".

The particle combination plays a significant role in the strength of the bond between "A/F'" and "B". Ideally the bond between "A/F'" and "B" use either a combination of: a) pockets or locks "L" and PCQP's; or b) "L" and GPWP's. If weight is not a concern, then the formation of the locks formed between the first polymerizable solution "A/F'" layer, and the PCQP's offer a low cost approach. Normally with this approach the present Inventor has found that highly fly ash filled Portland cement based materials with a density ranging from 80 to 100 pounds per cubic foot is appropriate for backing one foot square ceramic tile substitutes that are 0.375 inches thick and weigh about 1770 grams.

Also, in these composite tiles, the locks "L" and GPWP were used. The plastic scrap has a much lower density than the polymer coated quartz particles forming relatively lightweight material. Also, it was found as previously described, that the addition of pearlite to the initial highly filled polymer mix allowed for the formation of distinct locks "L".

Figure 5:
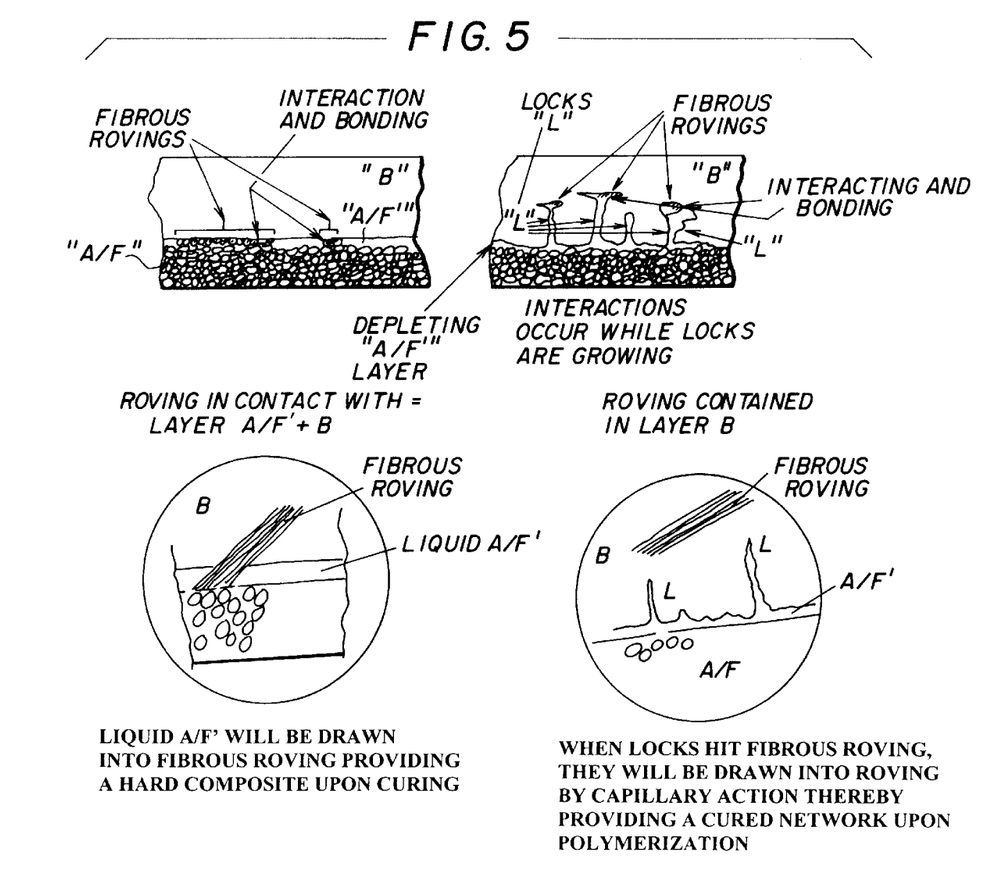
FIG. 5 is a cut-away view of the composite wherein the fibrous rovings are wetted out by layer "A/F'" to form strong mechanical and chemical bonds.

Regarding the mechanisms for strengthening the bond between the layers "A/F" and "B", the presence of fibrous additions that interact with first polymerizable solution "A/F'" can be used to advantage, see FIG. 5. The Portland cement based backing material should also contain a chemical additive that strengthens the adhesion of the fibrous material with the backing matrix, "B". Water borne and other acrylic lattices are ideal for accomplishing this improvement in adhesion. A non-exhaustive list that includes several excellent fibrous materials include rovings of A.R. glass, aramide flock, ceramic flock, steel mesh and non-fibrous steel needles.

A bond mechanism typical of that employed throughout the fiberglass industry occurs when the first polymerizable solution "A/F'" layer, contacts fibrous material mixed in the backing material. The thermoset material will wet out, to a certain extent, the glass or other fibrous material. When the curing process is complete, the end result will be a quasi-laminate structure at the interface, "A/F'/B". Chopped glass (preferably the A.R. type) roving bundles and many other fibrous additives can be mixed into cement based mixes in quantities dependent on their density. Normally, in the highly fly ash filled Portland cement based backing mixtures, chopped glass could be added to a maximum of about three weight percent of the dry components. In thin structures, the percent of glass roving bundles within the Portland cement based material that comes into intimate contact with the liquid layer can be large, e.g., 50% or greater in three eighth inch thick structures. This bond forms randomly over the entire planar surface area of liquid layer "A/F".

When the rising locks "L" intersect a fibrous material in the Portland cement based material, a second bond mechanism occurs, i.e., due to similar chemical structures, the polymerizing liquid will wet the roving. The strength of this chemical mechanical lock will be a function of many variables. The viscosity of the "A/F'" lock forming liquid, if low will provide more glass roving wet-out.

The following is a method of increasing the adhesive strength between the UV cured surfaces and high pressure formed smooth surfaces.

High pressure molded concrete is typically employed to produce pavers and flagstone products using automated press equipment. In this process, molds are filled with moist components to manufacture concrete, the excess is scraped from the surface and the mold top ram pressurizes the structure in the range of 1400 to 1800 psi. The structure, although uncured, is handleable in seconds and very smooth.

An excellent bonding layer may be obtained with several changes to conventional concrete mixtures. After the excess concrete is scraped from the surface, a small amount of fiber glass rovings or pre-cut open glass fabric is placed or dropped on the back surface of the moist concrete. The mold top ram then pressurizes the mix and, as before, the piece may be handled in seconds. Upon curing, the piece contains a fiber layer mechanically locked in place. The fiber layer appears exactly as un-wet glass. When UV curable filled polyester or polyurethane is placed on this glass surface, it immediately begins to wet the glass. In general, the viscosity of UV curable "A/F'" is lower than its two component reactive counterpart. Since the UV curable liquid is not reacting, wet-out can occur at its natural rate.

In another embodiment of this procedure, an intermediate step of placing and rolling unfilled UV curable material into the glass rovings and then placing an outermost filled layer "A/F" on top of this surface which additionally pre-wets the glass and provides the basis for the decorative functional top. When the UV light is applied, the laminate cures and excellent adhesion results between the concrete, the laminate and the aesthetic surface.

The present invention will become more fully understood from the detailed description given hereinbelow and the accompanying drawings which are given by way of illustration only, and thus are not to be considered as limitative of the present invention.

EXAMPLES

Compatible Process #1—Ceramic Floor Tile Substitute

1. Meter, mix and dispense into a one foot square mold three eighths inch deep, a polymerizing mixture containing 60 weight percent of a commercially available all mineral granite mix, "F" and 40 weight percent of the combined unsaturated promoted polyester resin and methyl ethyl ketone peroxide, "A". The mixed materials will cover the mold cavity to a depth of 0.100 inch.

2. Vibrate the mold containing the highly filled polymerizing liquid. The exposed surface of the casting will have a thin slightly filled liquid layer, "A/F'", topping a highly filled layer, "A/F".

3. Deposit at random into this liquid layer, "A/F'", approximately 50 grams of polymer coated quartz particles, "PCQP"s which have an average diameter of one quarter inch.

4. Meter, mix and dispense onto the yet uncured but polymerizing surface defined by liquid, "A/F'" and a polymer coated quartz particles, "PCQP", a pourable concrete paste containing one pound each of fly ash and Portland cement, 230 grams of clean sand, 25 grams each of an acrylic latex, an accelerator and a water reducer and approximately 275 grams of warm water.

5. The concrete mixture will gel in approximately one hour and demonstrate sufficient green strength to allow demold in ten hours.

The resultant concrete layer will exhibit no segregation effects from the fly ash and adheres securely to the very attractive polymer based surface. The bond mechanisms holding this composite together consists of pockets of the resin which form strong mechanical locks, "L". anchoring the concrete mix to the transition layer, a strong chemical bond between the cured transition layer polymer-previously liquid, "A/F'", and the polymer coated quartz particles, "PCQP". Also, weak chemical bonds are formed between the polymer coated quartz particles, "PCQC"s and the mechanical locks, "L" and between the cured Portland cement backing, "B" and "L". This tile weighs approximately 1720 grams.

Compatible Process #2—Light Weight Ceramic Floor Tile Substitute

1. Meter, mix and dispense into a one foot square mold three eighths inch deep a polymerizing mixture containing 55 weight percent of a commercially available all polymer chip mix plus aluminum trihydrate based granite mix, "F" and 45 weight percent of the combined unsaturated promoted polyester resin and methyl ethyl ketone peroxide, "A". The mixed materials will cover the mold cavity to a depth of 0.100 inch.

2. Vibrate the mold containing the highly filled polymerizing liquid. The exposed surface of the casting will have a thin liquid layer, "A/F'", topping a highly filled layer, "A/F".

3. Allow the segregated mix additional time to polymerize as demonstrated by a slightly increased viscosity. This provides additional support for the much larger particle additions and prevents the large particles from showing through and destroying the cosmetic appeal of the surface.

4. Deposit at random into this liquid layer, "A/F'", approximately 25 grams of ground plastic waste particles, "GPWP", followed by a pourable concrete paste containing one pound each of fly ash and Portland cement, 70 grams each of light weight ingredients pearlite and thermolite and 0 grams of clean sand, 25 grams each of an acrylic latex, an accelerator and a water reducer and approximately 350 grams of warm water.

5. The concrete mixture will gel in approximately one hour and demonstrate sufficient green strength to allow for demolding in fifteen hours. The light weight material will not possess the physical properties of the denser material of process 1 above.

The resulting light weight concrete layer will exhibit no segregation effects from the fly ash and will adhere securely to the very attractive polymer based surface. The bond mechanisms holding this composite together consist of pockets of "A/F'" or strong mechanical locks, "L", anchoring the concrete mix to the transition layer, a strong chemical bond between the cured transition layer polymer—previously liquid, "A/F'", and the ground plastic waste particles, GPWP's and weak chemical bonds between both the GPWP's and the mechanical locks, "L" and between the cured Portland cement backing, "B" and "L". Also, there are two additional bonding mechanisms since the Thermolite AF commercially available from the R.J. Marshall Co. contains glass fibrous reinforcement in the form of fiberglass roving bundles. These two bonds result from (1) the polymerizing liquid layer surface and the fibers that are in intimate contact as a result of being introduced as part of the concrete mix and (2) the interaction (wet-out and laminate formation) of the polymerizing liquid in the locks, "L", with the fiber bundles that are not in direct contact with the liquid layer, "A/F'" but are contacted by the growing locks, A"', during the transition period. This tile weighs approximately 1250 grams.

Compatible Process #3—Process for Producing Tile Panel Sections

1. In this Compatible Process, a more complex mold is used than the simple tile mold as used above. The mold surface may be divided into partitions or there may be other raised configurations that need to be built into the tile e.g. an arrow. These partitions may be divided by modified three eighths or one quarter inch modified half rounds that when cast approximate the configuration of grout lines. The mold used for this example contains the raised modified half rounds approximating grout lines.

2. Meter, mix and dispense into the mold partitions a polymerizing mixture containing 55 weight percent of a commercially available all polymer chip mix plus aluminum trihydrate based granite mix, "F" and 45 weight percent of the combined unsaturated promoted polyester resin and methyl ethyl ketone peroxide, "A" or other suitable multi-component thermoset liquids. The mixed materials will cover the partitions to a depth of 0.100 inch leaving the raised dividers clearly visible and free of filled resin mix.

3. Vibrate the mold containing the highly filled polymerizing liquid. The exposed surface of the casting will have a thick liquid layer, "A/F'", topping a highly filled layer, "A/F".

4. Allow the segregated mix additional time to polymerize as demonstrated by a slightly increased viscosity. This provides additional support for the large particle addition, and provides a bonding surface for a second filled thermoset liquid mixture, "A1" which supplies the color in the design of the grout line. Note, the composition of the second liquid, "A1" does not necessarily contain a filler to give a granite look and the color possibilities for this liquid are infinite.

5. Deposit at random into these polymerizing liquid layers, "A/F'" and "A1", approximately 25 grams of ground plastic waste particles, "GPWP" which have an average diameter of one quarter inch.

6. Meter, mix and dispense onto the yet uncured but polymerizing surface defined by liquid, "A/F'" and the ground plastic waste particles, "GPWP's", a pourable concrete paste containing one pound each of fly ash and Portland cement, 70 grams each of the light weight ingredients of pearlite and thermolite and 0 grams of clean sand, 25 grams each of an acrylic latex, an accelerator and a water reducer and approximately 350 grams of warm water.

7. The concrete mixture will gel in approximately one hour and demonstrate sufficient green strength to allow demold in ten to fifteen hours.

The bonding mechanisms will be exactly the same as in process 2 above except for the locks, "L" and the ground plastic waste particles, "GPWP", will be secured by two liquid layers, "A" and "A1" which will be of different color and viscosity.

The cosmetically appealing end product will be a panel that contains many individual tiles separated by pre manufactured grout lines. This product approach offers potential cost reduction in the process or added value during the installation process. A one foot square of the light weight version of this tile weighs approximately four pounds and is three quarters of an inch thick overall. The application of fine silica (0.050 micron diameter) prior to deposition of mixed F and A will result in textured non-slip surfaces, which are ideal for pavers.

Compatible Process #4—Process for Special Functions into More Complex Configures Tile 1. The following example uses the grout configured mold in process #3 above.

2. Meter, mix and dispense into the mold partitions a polymerizing mixture containing 55 weight percent of a commercially available all polymer chip mix plus aluminum trihydrate based granite mix, "F" and 45 weight percent of the combined unsaturated promoted polyester resin and methyl ethyl ketone peroxide, "A" or other suitable multi-component thermoset liquids. The mixed materials covers the partitions to a depth of 0.100 inch leaving the raised dividers clearly visible and free of filled resin mix.

3. Vibrate the mold containing the highly filled polymerizing liquid. The exposed surface of the casting will have a thick liquid layer, "A/F'", topping a highly filled layer, "A/F".

4. Allow the segregated mix additional time to polymerize as demonstrated by a slightly increased viscosity. This provides additional support for the addition of much larger particles, and provides a bonding surface for a second filled thermoset liquid mixture, "A2". Liquid "A2" has very special properties in that a phosphorescent pigment, Luminova costing over 160 U.S. dollars per pound, was mixed into the two component thermoset unsaturated polyester liquid at fifty weight percent of the total mixture. This polymerizing mixture was carefully painted onto the exposed raised mold components that configure the pre-manufactured grout lines. Liquid "A2" in this case must adhere well to liquid layer, "A/F'" and it must adhere well to liquid layer, "A1" which provides exactly the same functions as it did in compatible process #3. The now third liquid layer "A1" is applied to the back of layer "A" and encapsulates layer "A2". Note, again the composition of liquid, "A1" does not contain a filler to give a granite look and the color possibilities for this liquid are not limited, but ideally include whites and very light colors for the background for the phosphorescent liquid, "A2".

The list of polymeric resins that can be used as carriers for the phosphorescent pigment should have the following two advantages. First, the material should approach water white color, so as not to impair light absorption and transmittal. Second, the phosphorescent pigment itself acts as a strong catalyst in some systems. ski Hydrogenated bisphenol A epoxies cured with aliphatic amines or UV cured materials based on the above material modified with high functionality acrylates are excellent when used with filled epoxy based first polymerizing liquids. If the first polymerizing liquid is polyurethane based, then aliphatic urethanes and aliphatic urethane acrylate monomers and oligomers would be used in place of the epoxy. The chemicals are produced by Ciba Geigy, Sartomer, Ashland, Shell, Dow and several other manufactures.

There are many colorless materials that are multi-component liquid thermosets, which are not preferable, since these thermosets yellow over time.

5. Deposit at random into these polymerizing liquid layers, "A" and "A1", approximately 25 grams of ground plastic waste particles, "GPWP" which have an average diameter of one quarter inch.

6. Meter, mix and dispense onto the yet uncured but polymerizing surface defined by liquid, "A/F'" and the ground plastic waste particles, "GPWP's", a pourable concrete paste containing one pound each of fly ash and Portland cement, 70 grams each of light weight ingredients pearlite and thermolite and 0 grams of clean sand, 25 grams each of an acrylic latex, an accelerator and a water reducer and approximately 350 grams of warm water.

7. The concrete mixture will gel in approximately one hour and demonstrate sufficient green strength to allow demolding in ten to fifteen hours.

The bonding mechanisms will be exactly the same again as in compatible processes 2 above except the locks, "L" and the ground plastic waste parties, "GPWP", is secured by two liquid layers, "A/F'" and "A1" which will be of different color and viscosity. The phosphorescent layer "A2" is totally encapsulated by liquid layers "A" and "A1".

The cosmetically appealing end product will be a panel that contains many individual tiles separated by pre manufactured grout lines that are light in color and will glow for up to ten hours after exposure to a light source. This approach offers not only a potential cost reduction during the installation process but it also possesses a safety feature useful in areas such as the surroundings of pools, fire stairwells which may become totally dark if power is lost during a fire, and in subway ques. A one foot square of this light weight version paneled safety tile weighs approximately four pounds as the part is three quarters of an inch thick overall. Since the cost of long time phosphorescent pigments (Luminova produced by United Minerals Corp.) is currently approximately $160.00 per pound, the process allows for the selective application of the very expensive compound to only the portion of the tile intended for pigmentation in the depressed non wear areas of the tile. Arrows and other indented safety and directive information could be inexpensively applied using this procedure.

Compatible Processes #5—Planned Extensions of the Sequential Deposition Process

1. This process will be described using the mold in compatible processes #1 and #2 and assumptions detailed when appropriate. The first assumption will be the liquid layer, "A/F'" is not produced because the material is too highly filled, an injection molded thermoplastic insert is used, an extremely fast curing heat activated thermoset composition requiring a heated mold is used, or a rolled, cured and cut piece is employed that fits the mold cavity.

2. Once the parts are in the mold partitions, the next step is to introduce liquid layer, "A/F'". This may be done through a process described as metering, mixing and dispensing through either bulk liquid mixers or spraying. The slightly filled reactive liquid thermoset layer "A1", in contrast to that produced during segregation (liquid layer "A/F'"), will have been chosen to adhere to the components placed or formed in the partitions as well as perform the other functions previously listed. It is not necessary that the original forming liquid or material be identical to the sprayed or deposited liquid layer. It will probably provide an important cosmetic function of the part e.g. creating the cast in place grout lines.

3. Deposit at random into this polymerizing liquid layer, "A1", approximately 25 grams of ground plastic waste particles, "GPWP" which have an average diameter of one quarter inch.

4. Meter, mix and dispense onto the yet uncured but polymerizing surface defined by liquid, "A1" and the ground plastic waste particles, "GPWP's", a pourable concrete paste containing one pound each of fly ash and Portland cement, 70 grams each of light weight ingredients pearlite and thermolite and 0 grams of clean sand, 25 grams each of an acrylic latex, an accelerator and a water reducer and approximately 350 grams of warm water.

5. The concrete mixture will gel in approximately one hour and demonstrate sufficient green strength to allow demolding in ten to fifteen hours.

The light weight concrete layer will exhibit no segregation effects from the fly ash and be adhered securely to the very attractive polymer based surface insert. The bond mechanisms holding this composite together will consist of strong mechanical locks, "L" formed from liquid layer "A2" anchoring the concrete mix; a strong chemical bond between the cured liquid layer polymer "A1", and the ground plastic waste particles, "GPWP's" and weak chemical bonds between both the ground plastic waste particles, "GPWP's" and the mechanical locks, "L" with the cured Portland cement backing, "B". In addition there will be two additional bonding mechanisms since the Thermolite AF commercially available from the R.J. Marshall Co. contains glass fibrous reinforcement in the form of fiberglass roving bundles. These two bonds result from (1) the polymerizing liquid layer surface and the fibers that are in intimate contact as a result of being introduced with the concrete mix and (2) the interaction of the polymerizing liquid in the locks, "L", with the fiber bundles that are not in direct contact with the liquid layer. The product will have an extremely appealing wear resistant surface created by one of many possible manufacturing methods. In addition, the mechanical locks will have been formed by a material quite possibly not the same as that in the partitions. The production flexibility aspect of the process has been expanded greatly.

In Compatible Processes #1–#5, steps 1 through 5 may be performed in a much deeper mold and the surface area may be larger, e.g. based on an eighteen inch by sixteen inch or an eighteen by eighteen inch square. All that is required to accommodate the increased volume, is to increase the mixtures for both the composite's surface component and backing component proportionally. These composites may be used as interior tiles, pavers or flagstones, respectively.

Also, in Compatible Processes #1–#5, when the ratio of A/F' to A/F was approximately 30%, the lock height normal to the A/F interface could exceed 0.200 inches. The lock heights were observed to form in the range of 0 to 0.200 inches. The amount of fines contained in the filler "F" constitutes approximately 50 wt % of the filler.

In each of Compatible Processes #1–#5, the process was performed under ambient conditions.

Compatible Process #6—UV Curable Surface Component with Cured Concrete Inserts

Figure 4:
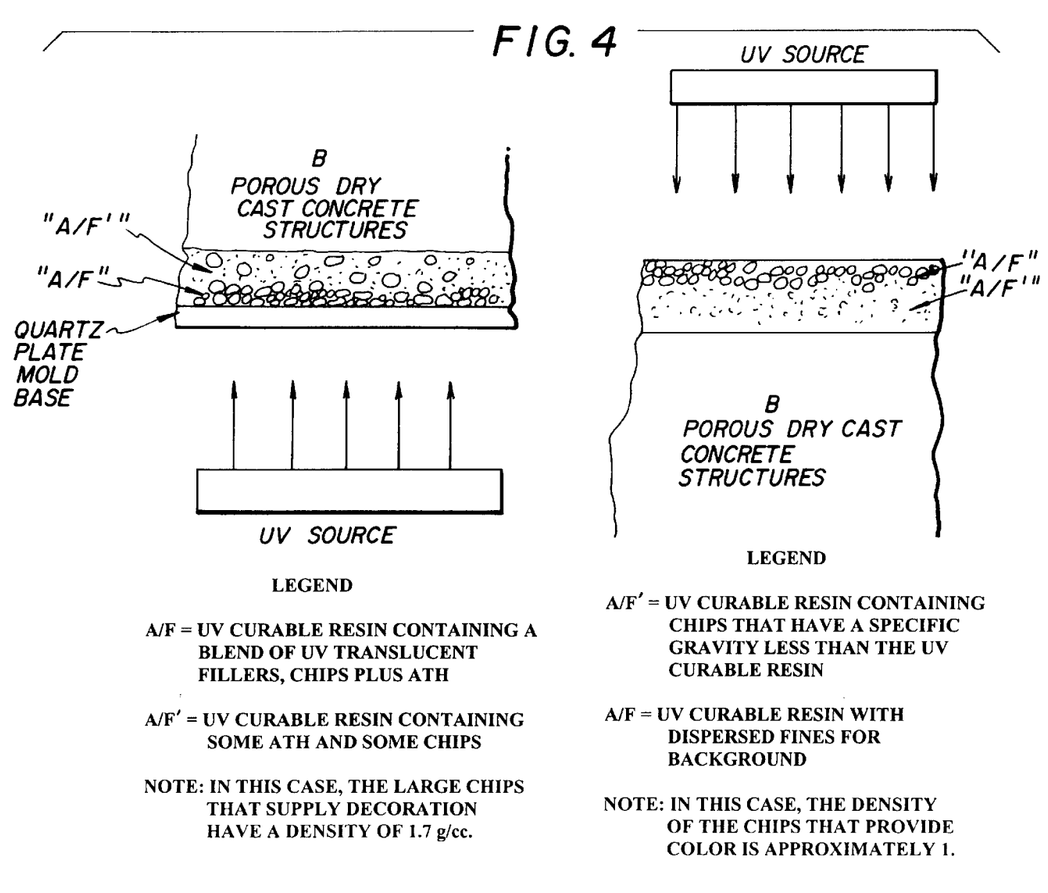
FIG. 4 is a cut-away view of the composite incorporating a polymeric binder which is curable with ultraviolet radiation wherein the UV source can be placed either above or below the mold.

1. Meter, mix and dispense into a quartz bottomed mold UV curable mixture containing 30 to 55 weight percent of a commercially available all polymer chip mix plus mineral blend based granite mix, "F" and 70 to 45 weight percent of a photo-initiated cure based polyester acrylate, epoxy acrylate or polyurethane acrylate polymer or other suitable multi-component thermoset liquids, see FIG. 4. The mixed materials will fill the transparent released mold to a maximum depth of 0.100. Support the mold with edge guides and locate the UV lamp(s) under the edge guides or illuminating upwards.

2. Vibrate the mold containing the highly filled UV curable liquid. The exposed surface of the casting will have a thin liquid layer, "A/F'", topping a highly filled layer, "A/F'". Note in this mold the base must be transparent to ultra violet energy. Vitrified quartz is the recommended material, however, acrylic sheet, glass and other transparent materials will be sufficient at some cost to efficiency, for low numbers of exposures.

3. Position the cured concrete insert into the resin rich surface "A/F'" which has segregated from the original filled coating (A/F). The insert may be a paver brick, a conventional 8"x8"x16" block, conventional concrete bricks, conventional 8"x16"x2" concrete patio stone or any other dry cast or conventionally cast concrete structure.

4. Expose the bottom of the mold to the appropriate ultra-violet radiation. The material cures quickly as a function of composition, coating thickness, fill level, radiation spectrum and intensity and other variables.

5. The composite will be totally cured within seconds and consist of an attractive functional surface backed by the chosen conventionally produced concrete product.

The finished product is a composite structure comprising an attractive functional polymeric surface securely bonded to a pre-manufactured concrete insert. The polymeric surface can be produced to be UV stable. It may be solid colored, granite-like or marble-like in appearance. It can also be textured and made to replicate the texture of the concrete product. The surface will be impervious to water, graffiti resistant and can be compounded to provide special properties. The concrete backing structure may be produced to control surface smoothness, bonding strength, background color, structural and physical properties.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A composite structure suitable for a wide range of building products comprising:

a first layer of solid particles mixed with a polymeric binder;

a second layer of an organic and/or inorganic solid;

an optional transitional layer located between the first and second layers comprising both the polymeric binder and the organic and/or inorganic solid, wherein the polymeric binder is contained in pockets within the organic and/or inorganic solid and at least some of the pockets of the polymeric binder extend from the first layer; and a third layer of a cured polymer resin in contact with at least one of the first, second, or transitional layers, the third layer having color different from the first layer;

with the proviso that the transitional layer must be present unless the organic and/or inorganic solid is a cast structure having a smooth surface and the polymeric binder is curable with ultraviolet radiation; and with the additional proviso that when the organic and/or inorganic solid is a cast structure, then the polymeric binder is curable with ultraviolet radiation.

2. A composite structure suitable for a wide range of building products comprising:

a first layer including an ultraviolet radiation curable polymeric binder having mixed therein solid particles comprising at least one of vitrified quartz, aluminum trihydrate, glass frit, fly ash, perlite, or silica plus at least one of colored transparent polyacrylics, colored quartz, colored translucent polyacrylics or unsaturated polyesters containing aluminum trihydrate;

a second layer of an organic and/or inorganic solid; and a transitional layer located between the first and second layers and including portions of the polymeric binder and the organic and/or inorganic solid, wherein the polymeric binder is contained in pockets in the organic and/or inorganic solid and at least some of the pockets of polymeric binder extend from the first layer.

3. The composite structure of claim 2, wherein the organic and/or inorganic solid of the second layer is prepared from a slurry, paste, or liquid which has a higher specific gravity than a polymerizable solution used to prepare the polymeric binder of the first layer and the transitional layer.

4. The composite structure of claim 2, wherein the polymeric binder of the first layer is selected from the group consisting of polyurethanes, polyepoxides, epoxyacrylates, urethane acrylates, unsaturated polyesters, acrylics, and mixtures thereof.

5. The composite structure of claim 2, wherein the organic and/or inorganic solid is an inorganic solid comprising Portland cement and fly ash.

6. The composite structure of claim 5, wherein the organic solid further comprises at least one of sand, gravel, lightweight aggregate, perlite, lightweighting mixtures, acrylic latex, an accelerator, a water reducer, and water.

7. The composite structure of claim 6, wherein the accelerator is selected from the group consisting of soluble inorganic salts; alkali or alkaline earth carbonates; aluminates; halides; ferrites; calcium formate; calcium acetate; triethanolamine; and calcium aluminate cements.

8. The composite structure of claim 6, wherein the water reducer is selected from the group consisting of salts and derivatives of lignosulfonates, salts, and derivatives of hydroxy-carboxylic acids, superplasticizers, sulfonated melamine-formaldehyde condensate, and naphthalene sulfonate-formaldehyde condensate.

9. The composite structure of claim 2, wherein the solid particles are in the range of 20–65 wt % and the polymeric binder is in the range of 80–35 wt % based upon the total mass of the first layer.

10. The composite structure of claim 2, wherein the organic and/or inorganic solid is a cast structure having a surface, and a fiber layered mechanically locked to the surface and bonded to the polymeric binder in the transitional layer.

11. A composite structure suitable for a wide range of building products comprising:

a first layer of solid particles mixed with a polymeric binder;

a second layer of an organic and/or inorganic solid; and an optional transitional layer located between the first and second layers comprising both the polymeric binder and the organic and/or inorganic solid, wherein the polymeric binder is contained in pockets within the organic and/or inorganic solid and at least some of the pockets of the polymeric binder extend from the first layer;

with the proviso that the transitional layer must be present unless the organic and/or inorganic solid is a cast structure having a smooth surface and the polymeric binder is curable with ultraviolet radiation; and with the additional proviso that when the organic and/or inorganic solid is a cast structure, then the polymeric binder is curable with ultraviolet radiation;

wherein the solid particles of the first layer comprise:

at least one of aluminum trihydrate, ground or whole grain silica, calcium carbonate, transitional metal oxides, a mineral granite mixture, clear polymer chips, fly ash, perlite; and at least one of aluminum trihydrate-based granite mixture, polymer-coated minerals, opaque or transparent colored acrylic, pigmented acrylic modified unsaturated polyester chips and mixtures thereof.

12. The composite structure of claim 11, wherein the polymeric binder is a multi-component component thermoset.

13. A composite structure suitable for a wide range of building products comprising:

a first layer including an ultraviolet radiation and thermal curable thermoset polymeric binder containing a mixture of ultraviolet radiation-transmitting solid particles and ultraviolet radiation-absorbing solid particles, at least some of the solid particles having decorative characteristics;

a second layer providing a cement-based substrate;

a transition layer located between the first and second layers and including the polymeric binder and interfacial portions of the substrate, wherein the polymeric binder is contained in pockets and pores of the substrate to provide a mechanical bond between the first and second layers.

14. The composite structure of claim 13, wherein the polymeric binder is selected from a group including polyurethanes, polyepoxides, epoxyacrylates, urethane acrylates, unsaturated polyesters, acrylics and mixtures thereof.

15. The composite structure of claim 13, wherein the solid particles of the first layer include:
- at least one of vitrified quartz, aluminum trihydrate, glass frit, ground or whole grain silica, clear polymer chips, transparent colored acrylics, and calcium carbonate; and
- at least one of fly ash, perlite, transition metal oxides, colored polymer chips, mineral granite mix, polymer-coated quartz, color-filled acrylics, and pigmented acrylic modified unsaturated polyester chips.

* * * * *